Jan. 29, 1963 J. M. LYLE 3,075,549
TWO TEMPERATURE HOT WATER TANK FITTING
Original Filed March 25, 1954 3 Sheets-Sheet 1

INVENTOR
JOHN M. LYLE

BY *Strauch, Nolan & Neale*
ATTORNEYS

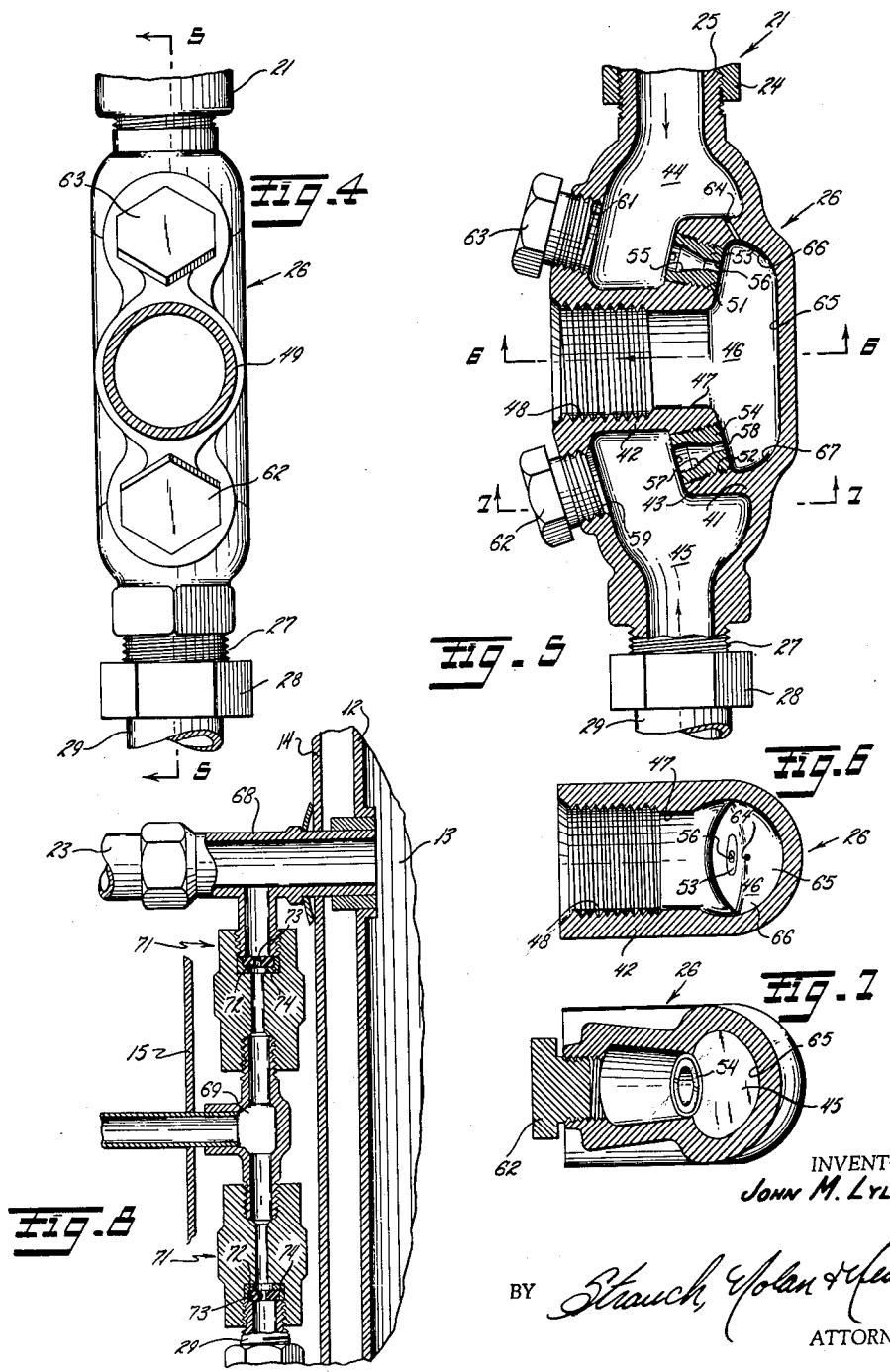

Jan. 29, 1963 J. M. LYLE 3,075,549
TWO TEMPERATURE HOT WATER TANK FITTING
Original Filed March 25, 1954 3 Sheets-Sheet 3
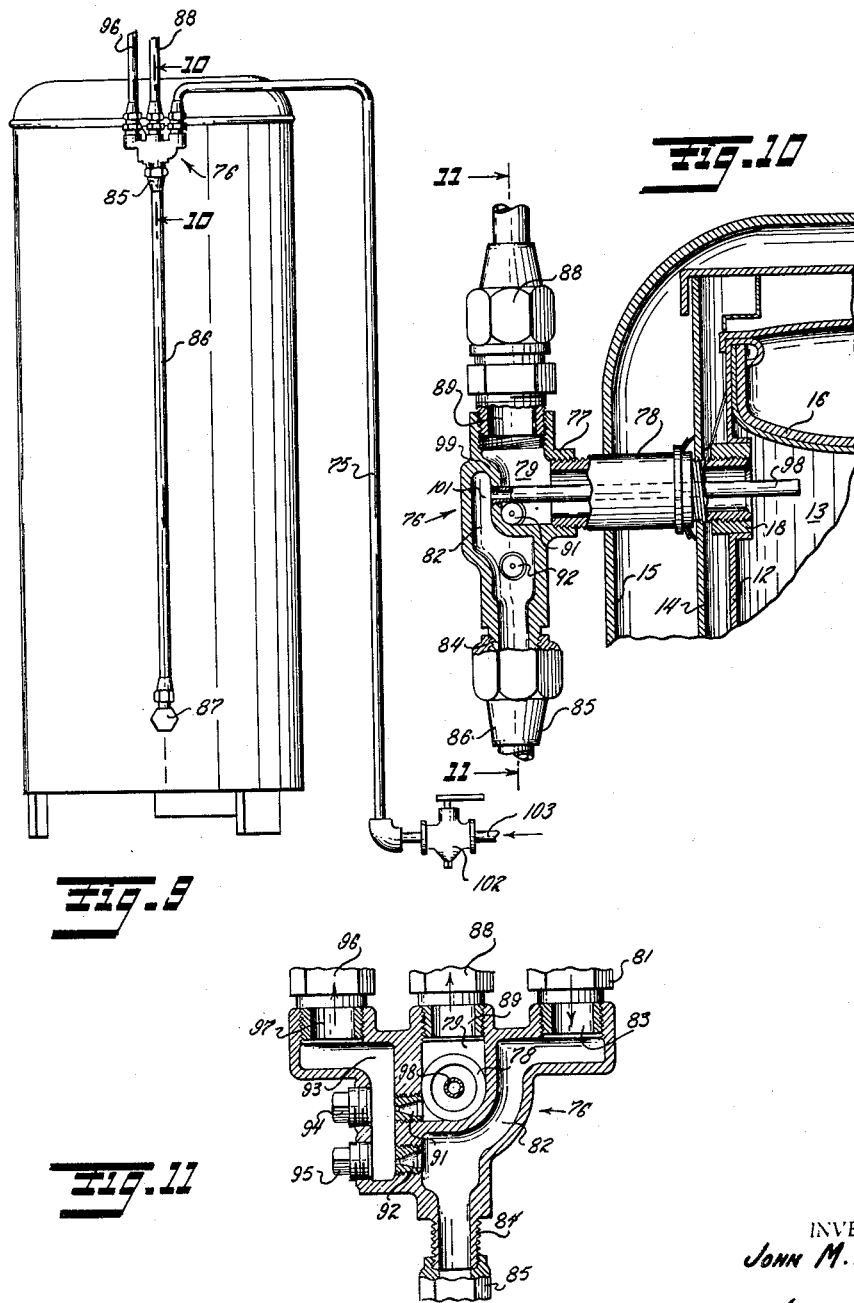
INVENTOR
John M. Lyle
BY
ATTORNEYS

United States Patent Office 3,075,549
Patented Jan. 29, 1963

3,075,549
TWO TEMPERATURE HOT WATER TANK FITTING
John M. Lyle, Kalamazoo, Mich., assignor to Ruud Manufacturing Company, Kalamazoo, Mich., a corporation of Delaware
Original application Mar. 25, 1954, Ser. No. 418,570. Divided and this application Feb. 24, 1960, Ser. No. 22,072
1 Claim. (Cl. 137—597)

This invention relates to hot water heating and/or storage tanks and is particularly concerned with arrangements for providing for withdrawal of hot water at two different temperatures for different household or like services from the same hot water tank. This is a division of my copending application Serial No. 418,570 which is a continuation-in-part of my copending application Serial No. 288,463 filed March 17, 1952, now abandoned.

Prior to the advent of automatic laundering machines, automatic dish washers and the like for household use, the controls for the usual household hot water tank were set to supply hot water at a suitable temperature for bathroom, lavatory, kitchen and other uses where the water was not so hot as to injure the human skin with which it came in contact. Consequently most of these prior hot water heaters were usually set to heat the water up to about a temperature of about 125° F. or a little higher. Much higher water temperatures, usually about 180° F., are needed for efficient automatic washer and dish washer uses. This is too hot for contact with human skin. Hence, in the normal use of the single temperature hot water heater prior to the invention, the housewife, to avoid constant manipulation of the automatic controls, usually set the thermostat for the hot water tank at an intermediate temperature of about 150° F. which more or less often proved unsatisfactory and non-efficient for both services. It was hot for human contact, and not hot enough for the automatic cleaning devices.

The present invention provides a hot water supply system wherein two different and accurately predictable water temperatures, varying as widely as 125° F. and 180° F. for example, may be drawn out of a single hot water storage tank, and in the form of the invention which is illustrated for purposes of disclosure herein this is attained by a special mixing valve and fitting assembly which permits the withdrawal of maximum temperature water from the tank for services such as automatic washers and dilutes a portion of the high temperature water withdrawn from the tank with cooler water to provide a lower temperature hot water source for bathroom, lavatory and like services.

It is therefore the major object of the present invention to provide a novel hot water storage tank assembly which provides two sources of hot water at two different temperatures for different services.

A further object of the invention is to provide a hot water storage tank outlet fitting arrangement which provides for the withdrawal of the hottest water from the tank and passes a portion thereof to one hot water supply conduit and mixes the remaining portion of the water withdrawn from the tank with cooler water and passes it to another outlet conduit to provide a lower temperature hot water source.

It is a further object of the present invention to provide a novel fitting for a hot water storage tank which provides for the simultaneous withdrawal from the tank of water at the highest temperature available within the tank and water at a substantially lower temperature.

A further object of the invention is to provide a novel mixing valve or fitting for noiselessly and controllably reducing the temperature of hot water withdrawn from a hot water storage tank.

A further object of the invention is to provide a novel hot and cold water mixing fitting having interchangeable orifice members.

It is a further object of the invention to provide a novel hot and cool water mixing valve fitting which is so constructed and arranged as to minimize noise attendant to mixing.

A further object of the invention is to provide a novel hot and cold water automatic mixing fitting that eliminates manually operated mixing valves.

A further object of the invention is to provide a novel arrangement for reducing the temperature and thereby preventing excess heating of the water in the upper normally hottest part of a vertical hot water tank.

It is a further object of the invention to provide a direct cool water bleed into the hottest water space of a hot water heating or storage tank to prevent excess temperature conditions.

It is a further object of the invention to provide a novel single mixing fitting for the top of a hot water tank having cool water inlet and at least two different temperature hot water outlets.

Further objects of the invention will presently appear as the description proceeds in connection with the appended claims and the annexed drawings wherein:

FIGURE 4 is a rear elevation in section on line 4—4 of FIGURE 2 showing the mixing valve fitting;

FIGURE 5 is a section on line 5—5 of FIGURE 4 showing internal structural details of the mixing valve;

FIGURE 6 is a section on line 6—6 of FIGURE 5;

FIGURE 7 is a section on line 7—7 of FIGURE 5;

FIGURE 8 is an end elevation in section like FIGURE 2 but showing a further embodiment of the invention for producing water at two different temperatures from the same tank;

FIGURE 9 illustrates a tank having a fitting constituting still a further embodiment of the invention;

FIGURE 10 is an enlarged section substantially on line 10—10 of FIGURE 9; and

FIGURE 11 is a section substantially on line 11—11 of FIGURE 10.

Figure 2:
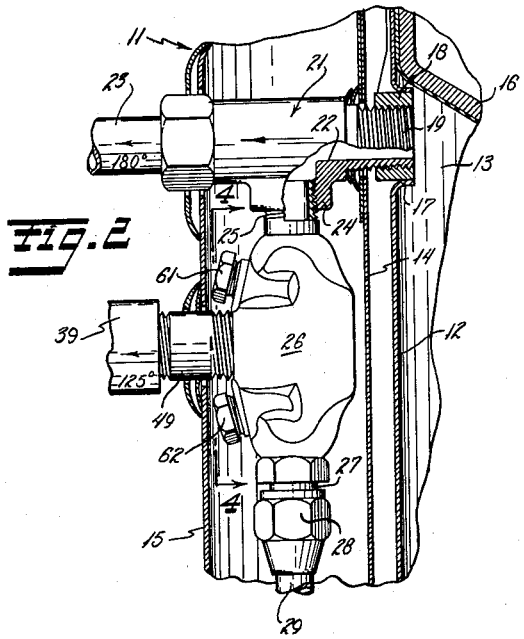
FIGURE 2 is an enlarged elevation partly in section showing the mixing valve fitting at the top of the tank.

Referring to the preferred embodiment of FIGURES 1–7, the hot water storage tank unit 11 is mainly of a generally conventional type comprising an inner upright cylindrical metal tank 12 enclosing the hot water space 13 and surrounded by a sheet metal casing 14 and an outer decorative cabinet 15. The space between tank 12 and casing 14 is usually filled with heat insulation material. In this particular unit a conventional gas or other heater (not shown) is mounted in the bottom of the unit below the closed bottom of the tank 12 and conventional adjustable controls (not shown) are provided for the heater to maintain a given water temperature within the tank 12.

At the upper part of tank 12 where the water is normally at the hottest temperature within the tank, the side wall of tank 12 just below top header 16 is formed with an opening surrounded by an inturned circular flange 17 which closely surrounds a solid metal spud 18 welded thereto with a watertight seam.

Spud 18 is internally threaded to receive the threaded arm 19 of the casing 20 of T-fitting 21 that opens into the hot water space 13. Within fitting 21 is a horizontal passage 22 which communicates directly at its outer end with a hot water outlet conduit 23.

The vertical leg 24 of fitting 21 is internally threaded to receive the externally threaded upper vertical inlet arm 25 of a mixing valve fitting 26, the interior of which is illustrated in FIGURE 5. The lower vertical inlet arm 27 of fitting 26 is similarly externally threaded and enters coupling 28 which connects it to the upper end of riser 29. The lower end of riser 29 is connected by coupling 31 to the externally threaded upright arm 32 of T-fitting 33.

Fitting 33 has one side arm 34 externally threaded to fit within an internally threaded spud 35 welded or otherwise mounted watertight in a circular flange 36 surrounding a side opening in the wall of tank 12 near bottom header 37. The horizontal passage through fitting 33 connects with the usual cool water inlet conduit 38.

In carrying out the invention according to this embodiment hot water fitting 21 and cool water from fitting 33 are admixed in a novel mixing valve fitting 26 to produce for withdrawal through hot water outlet 39 a tempered hot water supply at a lower temperature than the hot water entering fitting 21, and fitting 26 is shown in detail in FIGURES 4–7 as embodying certain details that contribute toward accurate noiseless operation.

Preferably fitting 26 is symmetrical about the section lines 5—5 of FIGURE 4 and 6—6 of FIGURE 5 except for a by-pass port at the hot water inlet side as will appear, thereby contributing to ease and uniformity and economy of manufacture. The fitting 26 will be described as shown in its operative vertically disposed position of FIGURE 1 although as a fitting per se it may be otherwise arranged.

Internally fitting 26 is formed with an integral generally cylindrical wall that is symmetrical about line 6—6 of FIGURE 5 and comprises a mixing chamber surrounding wall section 41 and a reduced outlet wall section 42 projecting inwardly from opposite sides within the fitting and having their adjacent ends connected by an annular generally radial shoulder section 43. This separates the interior of the fitting into a hot water inlet chamber 44, a cold water inlet chamber 45 and a mixing chamber 46 having an outlet bore 47 that is internally threaded at 48 to receive a short length of pipe 49 connecting bore 47 to tempered hot water outlet conduit 39. The hot and cold water inlet chambers are enlarged with respect to their supply conduits and a resultant pressure drop takes place therein for a purpose to appear.

Annular wall section 43 is formed with two internally threaded bores 51 and 52 preferably of the same size and symmetrically located with respect to the horizontal axis 6—6 of FIGURE 5. These bores open at opposite ends to the mixing chamber 46 and hot water inlet chamber 44 and cold water inlet chamber 45 respectively. These bores themselves may serve as the respective hot and cold water inlets to the mixing chamber but preferably I provide in them externally threaded orifice spuds 53 and 54 respectively. Spud 53 is provided with a smooth walled central bore having a decreasingly tapered intake section 55 terminating in a cylindrical discharge orifice section 56 of predetermined size. Likewise spud 54 is formed with a central smooth walled bore having a decreasingly tapered inlet section 57 terminating in a cylindrical discharge orifice section 58. Each of these spuds of predetermined size readily mounted in bores 51 or 52 and removed for repair or exchange for spuds with different sized discharge orifices. The spuds are interchangeable. On opposite sides of bore 47 (FIGURE 5) threaded openings 59 and 61 are provided in the fitting side which contain fluid tight plugs 62 and 63 in normal operation. These plugs are removable for insertion or removal of the spuds 53 and 54 and permit insertion of a screw driver or like tool to engage radial slots in the outer ends of the spuds when the latter are to be tightened or removed for exchange.

Wall section 41 is formed with a small diameter pressure equalizing by-pass port 64 which connects the hot water inlet chamber 44 directly with the mixing chamber 46 for a purpose to appear.

Referring to FIGURES 5–7, the internal surface 65 of the mixing chamber is smoothly arcuate about a generally vertical axis and is arcuate at its upper and lower ends 66 and 67 respectively, these surfaces 65, 66 and 67 all smoothly merging into one another so that the entire inner surface of the mixing chamber is substantially continuous and without sharp or abrupt interruptions or changes in direction. Port 64 opens through surface 66.

The axis of orifices 56 and 58 are preferably arranged to converge toward each other at the same angle to the horizontal, here about 15°, and the mixing chamber 46 is so proportioned with respect to the selected angle that incoming water streams from the discharge orifices 56 and 58 and deflected from surface 65 are directed to meet along the axis of bore 47 without encountering the inner surface of shoulder 43 whereby turbulence is reduced. Surfaces 66 and 67 are so shaped and related to the orifices that no dead pockets or eddy currents exist in chamber 46 and there is no collection of sediment in that chamber.

Referring to FIGURE 5, the hot and cold water streams enter the chambers 44 and 45 so as not to impinge directly on the orifice spud bores and so that the water passes through those bores only after deflection from the chamber walls. This insures that the orifices are not required to offer the entire necessary restriction to the flow to chamber 46 and in essence provides at both the hot and cold water sides a two-stage gradual pressure drop into chamber 46. The reduced pressures in chambers 44 and 45 enable the use of larger orifices 56 and 58, and such in turn lowers the actual velocity of flow through the orifices for a given rate of water flow through the fitting.

This minimized entering water velocity combined with the foregoing described associated predetermined directing of the hot and cold water streams into the smooth walled mixing chamber substantially eliminates the water noises which have been hitherto accepted as unavoidable in fitting of this general type. The by-pass port 64 which admits some hot water directly into chamber 46 further relieves the pressure in chamber 44 and thereby further lowers the velocity of hot water flow through orifice 56 where the chances of excess noise are greatest.

As a result of the invention it is possible to obtain in conduit 39 a thoroughly mixed tempered hot water flow. The relative sizes of orifices 56 and 58 may be chosen or varied to suit desired conditions for accurately predetermining the temperature of the water in conduit 39; and this may be done over a relatively narrow range, as 125° F. to 145° F., simply by selecting the proper orifice sizes and the fitting makes this possible over a wide range of flow rates. Actually the fitting will accurately mix the hot and cold waters with no spuds in the bores 51 and 52, but the availability of the different and interchangeable fixed diameter orifice spuds provides for the selection of an outlet temperature within conduit 39 over a suitable narrow range and in effect constitutes a ready but more or less fixed adjustment over that temperature range.

In a fitting of the kind above described wherein $9/16''$ diameter hot and cold water inlets are provided and the diameter of outlet bore 47 is $3/4''$, I have successfully used orifice spuds having orifice diameters at 56 and 58 in the order of $3/16''$, and several spuds with orifice diameters varying $1/16''$ apart are usually supplied. By-pass port 64 is about $1/8''$ in diameter and is located as close as possible to the orifice 56 as may be obtained by inserting a drill through the hot water inlet.

A further embodiment of the invention is disclosed in

Figure 1:
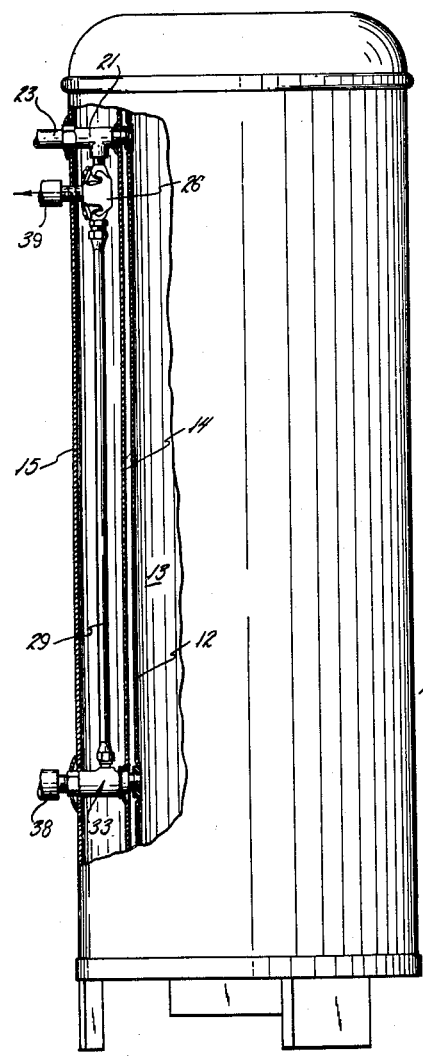
FIGURE 1 is a side elevation partly broken away and in section of a water storage tank embodying the mixing valve and special fittings of the invention for supplying two different temperatures of hot water from the same hot water storage space.
Figure 3:
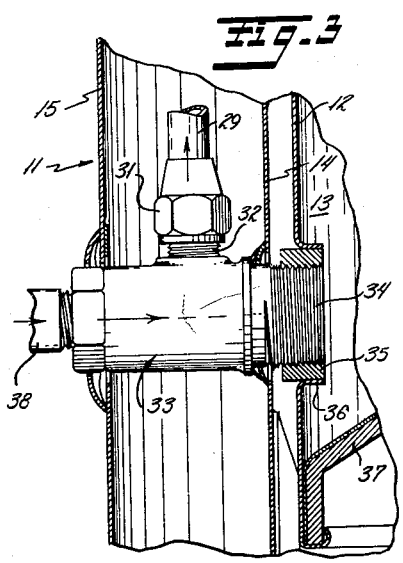
FIGURE 3 is an enlarged elevation partly in section showing the cool water inlet at the bottom of the tank.

FIGURE 8 wherein the T-fitting 68 has its opposite horizontal arms connected respectively to the space 13 within the hot water storage tank 12 and the hot water outlet conduit 23. The vertical branch of T-fitting 68 and the vertical cold water riser 29, which latter is connected at its lower end as in FIGURE 1, are connected to the upper and lower arms respectively of a mixing T-fitting 69 by couplings 71 which are identical and contain metering flow valves.

Each metering flow valve comprises a rubber or like resilient disc 72 having a central circular metering aperture 73. The disc 72 is provided with a cage 74 seated in the casing provided by coupling 71, and when the parts are assembled as shown the outer periphery of the disc 72 is clamped with a water tight seal and the aperture 73 lies in the direct flow path. The valve disc 72 thus supported is capable of some deflection in the direction of water flow and this deflection results in deformation that correspondingly reduces the size of aperture 73. Thus with increased water pressures the apertures 73 automatically decrease in size and they tend to automatically retain constant rates of fluid flow therethrough regardless of changes in pressures of the respective water supply lines. The particular valve structure and arrangement found most useful in couplings 71 is that disclosed in the Kempton Patent No. 2,454,929 issued November 30, 1948.

While the valves are arranged in vertical alignment, the pressure heads are so balanced and opposed that there is no leakage between the hot water outlet conduit 23 and the cold water inlet 38 even should the conduit 39 be closed.

In both of the foregoing embodiments of the invention hot water is made available at different temperatures, one at the tank space temperature such as at 180° for dishwashers, laundry, etc. and the other at a safe lower temperature for normal domestic use as in the bathroom, from a single conventional tank. In both embodiments the various T-fittings and couplings at the mixing station could be combined in a single fitting without departing from the spirit of the broad invention.

Referring to the embodiment illustrated by FIGURES 9–11, the tank 11 is of the same construction as described in the foregoing with side wall 12 and top header 16, but the cool water inlet conduit 75 is connected to a top mounted fitting 76 at the back of the tank and this single fitting controls distribution of all of the hot and cold water streams.

The side wall of the fitting 76 next to the tank has a threaded boss 77 for receiving one end of a short pipe 78 whose other end is threaded in spud 18. This provides a passage for introducing hot water from tank 12 into central chamber 79 of the fitting.

Referring to FIGURE 11, the end of cool water inlet conduit 75 is connected by coupling 81 into the upper end of a cool water passage 82 that starts with a vertical bore 83 in the upper part of fitting 76 and extends down around the side of chamber 79 to vertical boss 84 connected by coupling 85 to a riser 86 that in turn is connected through coupling 87 into the lower space of tank 12.

A hot water withdrawal conduit 88 is connected to a vertical central bore 89 which opens directly into chamber 79. Bore 89 is coaxial with boss 84.

The inner side walls of hot water chamber 79 and cool water chamber 82 are provided with side by side parallel threaded bores which contain orifice spuds 91 and 92 respectively that discharge into a mixing chamber 93 formed in the opposite side of fitting 76 from chamber 82. These spuds are like those at 53 and 54. The outer side wall of the fitting is provided with access openings normally closed by plugs 94 and 95. It will be noted that here also the incoming hot and cool water streams do not directly impinge upon the orifice spuds so that the effect of velocity head is minimized.

A tempered hot water withdrawal conduit 96 is connected to a vertical bore 97 that opens directly into the top of mixing chamber 93. Bores 83, 89 and 97 are preferably of the same size with bores 83 and 97 equally spaced from bore 89.

Referring now to FIGURE 10, a length of small diameter metal tubing 98 is mounted on internal wall 99 of fitting 76, one end being threaded into a bore 101 so as to open into the upper part of cool water passage 82. The other end of tube 98 extends concentrically through pipe 78 and terminates well within the water space of tank 12.

Referring to FIGURE 9, the lower end of cool water inlet conduit 75 is connected to a shut-off and drain valve 102 in a main 103 disposed below the level of tank 12.

In operation, as hot water is withdrawn from tank 12 through conduit 78, the water level in the tank is maintained through conduit 75, passage 82 and riser 86.

During this time hot and cool water streams pass through orifice spuds 91 and 92, respectively, into chamber 93 where they are thoroughly mixed and from which water at a temperature lower than that available in conduit 88 is available through conduit 96. The relative sizes of the orifice spuds, as in the foregoing embodiments, are selected in accord with other conditions to result in the desired water temperatures in the hot water withdrawal conduits.

Moreover I provide in the present invention in this embodiment a novel arrangement for preventing excess water temperatures in the upper part 13 of the water space in tank 12. Due to convection and the natural tendency of the hot water to rise in vertical tanks this problem of excess temperature water accumulating in the upper part of the tank is one which has been constantly encountered but never satisfactorily solved. In the present invention cool water constantly bleeds through tube 98 into space 13 to blend with and reduce the water temperature there. The size of tube 98 is chosen to suit the tank size, temperature limits and other known factors in each type of installation.

Tube 98 has a further highly advantageous function in the top mounted fitting arrangement of FIGURES 9–11. In houses where the cool water inlet pipe is above ground it is customary in cold weather to shut off valve 102 and drain conduit 75 to prevent freezing of the cool water line exposed to the weather. Tube 98 provides an antisiphon break between the hot and cold water circuits. This prevents the hot water contents of the tank from being entirely siphoned out as conduit 75 drains because the tube 98 acts as a pressure transmitting passage to break or prevent any vacuum in the cool water passages. Thus the hot water level in the tank remains undisturbed below the level of fitting 76 when conduit 75 is drained. With respect to the foregoing subject matter this application is a continuation-in-part of my copending application Serial No. 406,825 filed January 28, 1954 which issued June 30, 1959 as U.S. Letters Patent No. 2,892,465.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

In a mixing fitting for concomitantly providing two different temperatures of hot service water from a single source of high temperature water such as a hot water supply tank, a body having internal wall structure separating it into a cold water intake chamber having an inlet, a hot water intake chamber having an inlet adapted to be connected to directly receive said hot water from the source and a direct outlet adapted to be connected for supplying hot water to a point of use substantially at said high source temperature, and a mixing chamber containing an outlet for directly drawing off hot water at a lower predetermined temperature than said source water, a first metering port in the wall structure between said hot water and mixing chamber, a second metering port in the wall structure between said cold water and mixing chambers, said ports providing metered flow into said mixing chamber in such hot and cold water proportions as to provide hot water at said lower temperature in said mixing chamber when water is drawn from said mixing chamber, means for drawing hot water at said lower temperature out of the mixing chamber at the same time that hotter water is being drawn through said hot water outlet and means extending through said hot water intake chamber inlet providing a cold water injection passage for directly introducing cold water intake chamber into said tank.

References Cited in the file of this patent

UNITED STATES PATENTS

| | | |
|---|---|---|
| 1,210,105 | Schnaier | Dec. 26, 1916 |
| 1,924,038 | Herbsman | Aug. 22, 1933 |
| 1,997,481 | Buttner | Apr. 8, 1935 |
| 2,541,732 | Wilhelm | Feb. 13, 1951 |
| 2,548,938 | Booth | Apr. 17, 1951 |
| 2,662,541 | Noon | Dec. 15, 1953 |
| 2,708,092 | Smith | May 10, 1955 |
| 2,900,645 | Rom | Aug. 25, 1959 |

FOREIGN PATENTS

| | | |
|---|---|---|
| 461,154 | France | Oct. 22, 1913 |
| 758,831 | Great Britain | Oct. 10, 1956 |